Aug. 13, 1935.   W. LE R. DUNN   2,011,442
DISCHARGE TUBE FILTER
Filed Dec. 1, 1930   3 Sheets-Sheet 1

WILLIAM LeROY DUNN
INVENTOR.
BY Dorsey Cole
ATTORNEYS.

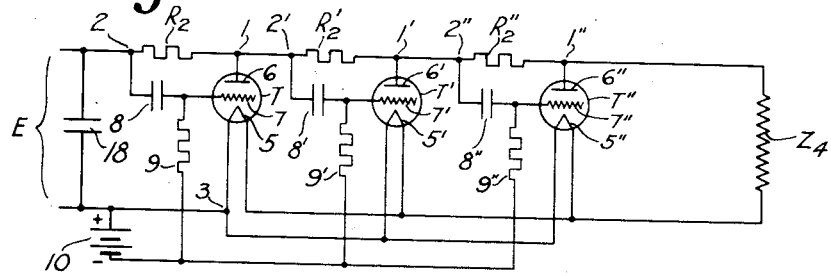
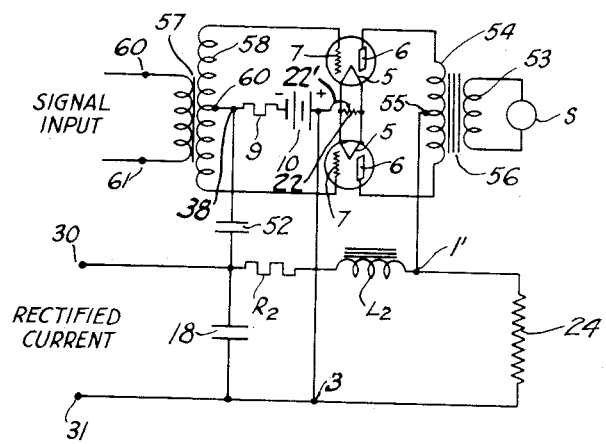

Aug. 13, 1935.    W. LE R. DUNN    2,011,442
DISCHARGE TUBE FILTER
Filed Dec. 1, 1930    3 Sheets-Sheet 3
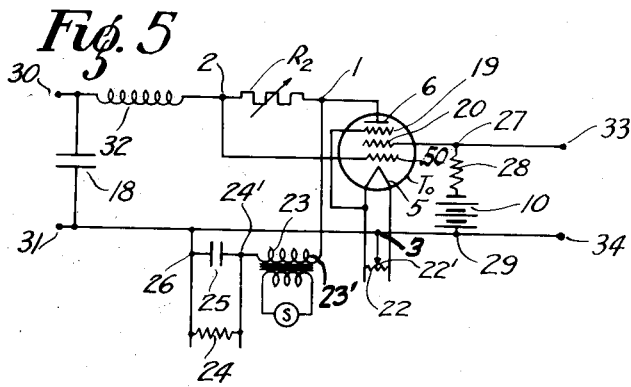
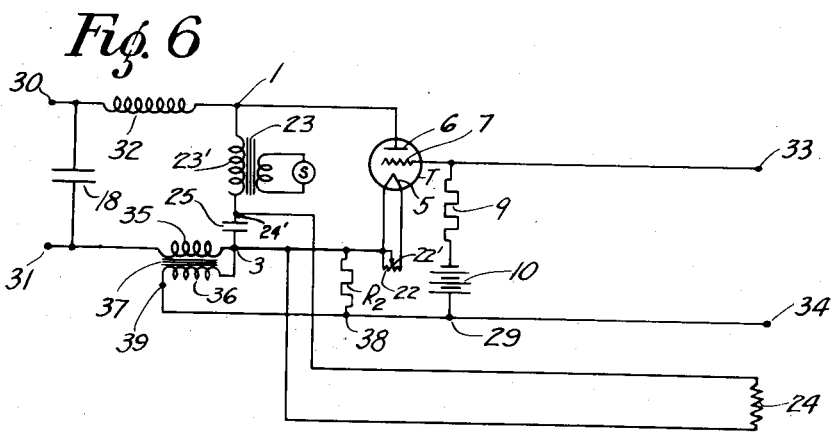
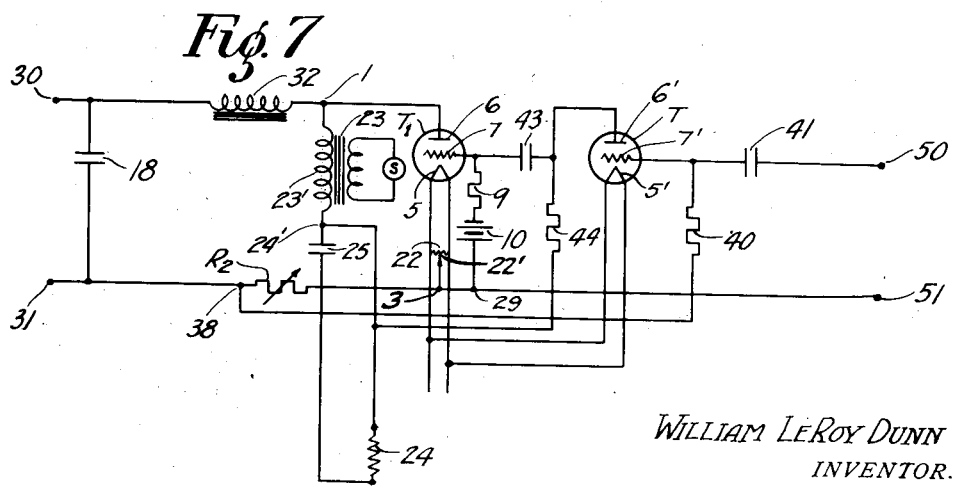
WILLIAM LeROY DUNN
INVENTOR.
BY Dorsey Cole
ATTORNEYS.

Patented Aug. 13, 1935

2,011,442

UNITED STATES PATENT OFFICE 2,011,442

DISCHARGE TUBE FILTER

William Le Roy Dunn, Quincy, Mass., assignor to Sprague Specialties Company, Quincy, Mass., a corporation of Massachusetts Application December 1, 1930, Serial No. 499,347

8 Claims. (Cl. 250—27)

My invention relates to novel filtering means to suppress the alternating current components present in sources of rectified current.

In various electrical devices, as those used for the production of sound, e. g., radio receiving and radio transmitting devices, sound amplifying devices or the like, direct current is required for the operation of the devices and in many instances, the most convenient and efficient way to obtain the direct current is by means of rectified alternating current.

For instance, the most widely used radio broadcasting receiving sets obtain their supply from the alternating current house lighting system, whereby the alternating current, after being transformed to the proper voltage, is rectified. The rectified current so obtained, however, is not a pure direct current but contains alternating current components or ripples which in general impair the operation of the device by causing disturbing noises, generally called hum. The rectified alternating current is used in the receiving sets primarily for the voltage supply of the plate and grid circuits and the usual method of suppressing the alternating current ripples is by means of filters consisting of inductances, resistances or both placed in series with and of capacitors placed in multiple to the above circuits.

However, the cost of the devices used for such filtering systems as well as space and other commercial considerations limit the use of such devices and thus the quality of filtering to such extent that the ultimate results leave much to desire.

In radio transmitting apparatus, filtering devices are used for similar purposes and in this case the operating voltages being of considerable magnitude the filtering devices adapted to stand such voltages are very costly.

An object of the present invention is to provide means whereby the alternating current ripples of rectified current are suppressed in a simple and convenient manner, which eliminates in whole or in part the use of filters of the above character, thereby greatly reducing the expenses of filtering and at the same time suppressing the ripples to a greater extent than has been possible heretofore.

A further object of my invention is to cause a discharge tube to generate voltages of such amplitude, phase and frequency as to eliminate on the load the effect of the ripples.

A further object of my invention is to provide for simple and convenient circuit arrangements to utilize the voltages generated by a discharge tube for eliminating the ripples from the rectified current applied to the useful load.

A further object of my invention is to provide for a circuit arrangement whereby the load which is to be supplied with pure direct current forms an arm of a bridge into which the rectified current and the suppressing voltages generated by the tube are fed in such a manner that the ripples of the rectified current are nullified.

A further object of my invention is to so counteract the alternating current components of the rectified current by the voltages generated by the tube, that a condition of balance is maintained and pure direct current supplied to the load irrespective of the amplitudes, phases and frequencies of the alternating current components of the rectified current and of variations in the value of the load.

A further object of my invention is to provide a plurality of tubes for the generation of voltages to suppress the ripples, the tubes being connected in a cascade arrangement whereby a very high degree of suppression of the ripples is obtained even in case of considerable variations in the tube characteristics or the constants of the circuits.

A further object of my invention is to provide circuit arrangements whereby a tube or a plurality of tubes already having certain functions in the circuit or circuits may also be assigned the function of generating the alternating currents to suppress the ripples.

A further object of my invention is to assign the function of generating the suppressing currents to a tube or tubes directly feeding in the output device.

Further objects of my invention will appear as the specification progresses.

In the accompanying drawings forming part of this specification, Figure 1 is a schematized diagram illustrating the principles of my invention.

Fig. 4 is a schematic diagram illustrating the use of a plurality of filter tubes in cascade arrangement.

Fig. 5 is a schematic diagram of a circuit arrangement in which a multiple grid tube having other functions in the circuit also serves as a filter tube.

Fig. 6 is a schematic diagram of a circuit arrangement in which a three-electrode vacuum tube is employed in the dual role of an amplifier and filter tube.

Fig. 7 is a schematic diagram of another circuit arrangement in which a vacuum tube functions simultaneously as amplifier and filter tube.

Fig. 8 is a schematic diagram of a circuit arrangement of an output stage of the so-called push-pull type, whereby the push-pull tubes are also acting as filter tubes.

Figure 1:
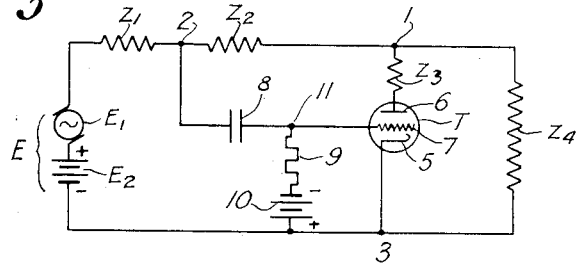

Referring now to Fig. 1 this figure shows a circuit arrangement in which a rectified current E represented by a direct current component $E_2$, and alternating current ripples $E_1$ is supplied to a load indicated as an impedance $Z_4$.

T is a discharge tube shown as a vacuum tube of the three-electrode type having a filament 5, a plate 6 and a grid 7. The filament 5 is connected at 3 with the negative side of the source of supply E and also with a suitable source of heating current showing of which has been omitted for the sake of simplicity.

The plate 6 is connected through impedances $Z_3$, $Z_2$ and $Z_1$, fully explained hereafter, to the positive side of supply voltage E. The grid 7 of the tube T is connected, by means of a coupling condenser 8, to the point 2 between impedances $Z_1$ and $Z_2$. The grid 7 is also connected by means of a resistance 9 to a battery 10 supplying the negative grid bias to the tube, the positive end of the battery being connected to the negative side of the source of supply E. It should be well understood that instead of using a separate battery for the grid bias, the source E itself may be used.

The load represented as an impedance $Z_4$ is connected with one end to connecting point 1 of impedance $Z_2$ and $Z_3$ and with the other end to the negative side 3 of the source of supply E.

In the diagram just explained, the impedance $Z_3$ represents the total impedance in that part of the plate circuit which falls between points 1 and 3 and thus includes the plate impedance of the tube.

Impedance $Z_2$, hereafter referred to as the balancing impedance, is provided between the points 1 and 2. The end 2 of impedance $Z_2$ is connected through a condenser 8 to the grid 7 of the tube, whereby as will be seen hereafter, the tube T is caused to generate alternating components equal in frequency and in phase with the alternating components of the rectified current and of suitable amplitude to maintain, as far as the alternating current components are concerned, the points 1 and 3 at the same potential. As the potential between points 1 and 3 is the potential applied to the load $Z_4$, no alternating current can flow through the load $Z_4$ which thus will be supplied with a pure direct current.

The tube T thus will act as a filter due to the fact that the rectified current flowing between the points 2 and 1 causes a voltage drop in impedance $Z_2$ of which only the alternating current components are passed by condenser 8 to the grid of the tube. Excitation of the grid by such alternating currents causes in the plate circuit of the tube the generation of alternating currents of similar character which in regard to points 1 and 3 are of a phase opposite to that of the alternating current components of the rectified current.

To obtain a complete balance between the points 1 and 3, and thus a perfect elimination of the ripples on the load, irrespective of the amplitudes, frequencies and phases of the alternating current components, I have found that the following relations have to be fulfilled:

$$Z_2 = \frac{Z_3}{M} \qquad 1$$

As both the impedances $Z_2$ and $Z_3$ have real and imaginary components it is necessary to also fulfill the following equations:

$$MR_2 = R_3 \qquad 2$$

$$ML_2 = L_3 \qquad 3$$

$$\frac{M}{C_2} = \frac{1}{C_3} \qquad 4$$

where $R_2$ and $R_3$ represent the resistances, $L_2$ and $L_3$ the inductances, and $C_2$ and $C_3$ the capacitances of $Z_2$ and $Z_3$, respectively, and M represents the amplification factor of the tube.

The impedance $Z_3$ and the amplification factor M of the tube being given, to obtain the above defined balance it is required to provide for an impedance $Z_2$ of such value that Equation 1 and thus Equations 2, 3 and 4 are fulfilled. It can be shown by computation that if the above equations are fulfilled the condition of balance is independent of the frequencies, phases, and amplitudes of the alternating components to be suppressed.

The impedances $Z_1$ and $Z_4$ do not appear in the above equations and therefore the condition of balance is independent of the nature and value of any impedance which may exist in the circuit supplying the rectified current and the input circuit, and also independent of the nature and value of the load.

Also the reactance of the coupling condenser 8, as long as it is kept small compared to the value of the grid resistance 9, which can be easily obtained in practice, can be left out of consideration.

As the potential of the points 1 and 3, as far as the alternating current components are concerned, is the same, the voltage drop caused by these components between the points 1 and 2, and thus in the balancing impedance $Z_2$ is essentially the same as between the points 2 and 3. Therefore the voltage applied to the grid 7 of the tube T is essentially the voltage drop prevailing in the balancing impedance $Z_2$.

In practice, differences exist in the characteristics of the individual tubes of a single tube type and therefore even when perfect balance has been obtained for an individual tube, its replacement by another tube of the same type may require a change in the value of $Z_2$ to restore perfect balance. Therefore, instead of using a fixed balancing impedance, a variable impedance may be used. However, the commercial tolerance now prevailing for standard type vacuum tubes, are, as a rule, sufficiently narrow to permit the use of a fixed impedance, the value of which is selected on the basis of the average characteristics of a tube type, and still obtain satisfactory filtering irrespective of variations of the individual tubes.

In case the impedance $Z_3$ is represented by a pure ohmic resistance $R_3$, fulfillment of Equation 2 suffices to obtain balance and thus instead of a balancing impedance $Z_2$ a balancing resistance $R_2$ can be used. The plate resistance of a standard vacuum tube is substantially an ohmic resistance and if no reactive impedance is present in the plate circuit a balanced condition can be obtained with a properly selected balancing resistance $R_2$.

Figure 2:
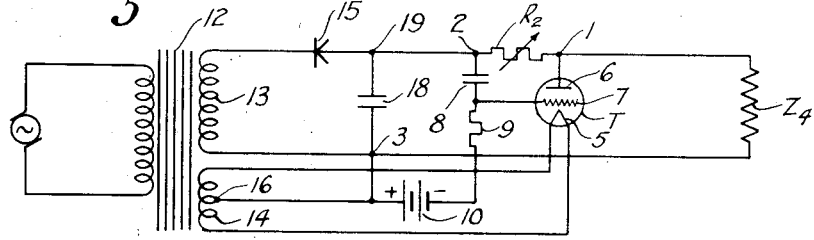
Fig. 2 is a schematic diagram of a circuit arrangement in which a three-electrode vacuum tube is used as a filter tube.

Fig. 2 illustrates an application of my invention whereby no reactance is assumed in the plate circuit and thus a balancing resistance—indicated as a variable resistance—R₂ is used. The alternating current is supplied through a transformer 12 provided with two secondary windings 13 and 14, the winding 13 supplying the alternating currents to be rectified and the winding 14 supplying the heating current for the tube filament.

One end of winding 13 is connected to one side of a rectifier 15—the other side of which is connected to 2—while the other end of the winding 13 is connected to the point 3. The rectifier 15 may be of any suitable design, either of the half or full wave type, for instance, a rectifying tube or a contact type rectifier. Irrespective, however, of the type, present day rectifiers generate or permit to pass more or less alternating current ripples. As illustrated 15 is a half wave rectifier type, and 2 and 3 represent again the positive respectively negative terminals of the rectified current supply.

The mid-point 16 of the winding 14 is connected to the negative terminal 3 of the rectified current supply. 18 is a condenser provided to complete the alternating current circuit of the filter tube T, and is connected across the terminals 2 and 3.

While the condenser 18 also acts to some extent as a filter for the ripples of the alternating current passing through or generated by the rectifier, this is merely incidental, because the capacity of the condenser 18, although sufficient for its purported function, is quite insufficient to cause substantial filtering.

The filament 5 of the tube, which also constitutes the cathode for the tube illustrated, is connected to the two ends of the winding 14. The plate 6 of the tube is connected at 1 to the balancing resistance R₂—the other end of which is connected to the positive terminal 2.

The grid 7 is excited from the balancing resistance R₂, being connected through the coupling condenser 8 to the positive terminal 2 of the source of rectified current supply, and the grid bias obtained by means of a separate battery 10, the negative side of which is connected to the grid through a grid resistance 9 of high value. The positive end of the battery 10 is connected to the negative terminal 3 of the rectified direct current.

Again, the grid excitation is supplied by the voltage drop in the balancing resistance R₂ and by proper selection of the resistance R₂ the points 1 and 3 will be equipotential in regard to alternating current ripples, and a pure direct current will flow through a load Z₄ connected between these points.

Figure 3:
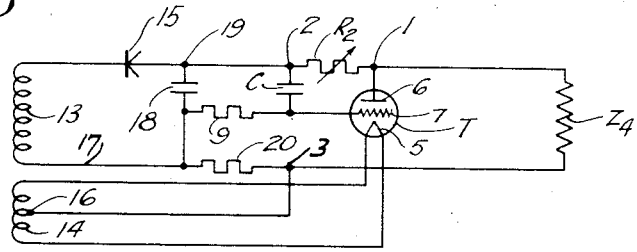
Fig. 3 is a schematic diagram of a circuit arrangement similar to that of Fig. 2 whereby the grid bias is secured from the source of rectified current.

Instead of using a separate source of supply 10 the grid bias, as shown in Fig. 3 can also be obtained from the rectified current supply, whereby all of the circuits except those specified are the same as in Fig. 2.

An additional resistance 20 is inserted in the negative side of the rectified current supply between 3 and the corresponding terminal 17 of transformer winding 13 to provide a negative potential drop for biasing the grid of the tube. The condenser 18 and the resistance 9 are connected directly to the transformer terminal 17 whereas the mid-point 16 of transformer winding 14 is connected to 3.

In this arrangement, the conditions to obtain proper balance are based on somewhat more complicated equations than in the previous case; however, their presentation is believed to be unnecessary. It suffices to state that in case the value of the resistance 9 is large compared to that of the balancing resistance R₂, the resistance R₂ can be determined with sufficient accuracy from Equation 2.

Where it is desired to obtain a very high degree of filtering, independent of any variations which may take place in the characteristics of the tubes or in the constants of the circuit, I may provide a plurality of filter tubes in cascade arrangement, as illustrated in Fig. 4, the alternating current ripples being successively reduced.

This arrangement is essentially the same as that shown in Figs. 1 and 2, the grid of each tube being excited by the voltage drop of a balancing resistance individual to each tube. The plate 6 of the first filter tube T is now connected to the balancing resistance R₂′ of a second filter tube T₁′, and the plate 6′ of the tube T₁′ is connected to the balancing resistance R₂″ of a third filter tube T″, the plate 6″ of which is connected to the load. It is evident that any desired number of filter tubes may be cascaded in such a manner.

The condition of balance is established individually for each tube circuit and thereby the ripples left by the first filter tube are further reduced by every subsequent tube. Such cascade arrangement is not required as a rule for receiving sets but may find application where it is desired to obtain from a rectified current a direct current of exceptional purity for instance in precision tests.

Instead of using a separate filter tube I have found that by proper circuit arrangement, tubes already having certain functions assigned to them can be used for filtering. As a rule it is the most convenient to use the so-called output tube or tubes for filtering, thus the tube or tubes which feed to the load and the following illustrations of my invention relate to such cases. However, it is well understood that the same or slightly modified arrangements are equally well applicable to other stages of a device.

In Fig. 5 I have illustrated a method of utilizing a five element vacuum tube T₀, commonly known as a pentode, both as the output tube of a receiver or amplifier and also as a filter tube.

The rectified but unfiltered current is supplied from a positive terminal 30 and a negative terminal 31 and flows from the positive terminal 30 through an inductance 32, point 2, balancing resistance R₂ to point 1. 1 is connected to the plate 6 of the tube and also connected through the primary winding 23′ of an output transformer 23 through terminal 24′ to a load 24 connected with its other end 26 through to terminal 31.

The load 24 represents all of the parts of the receiver, aside of the tube T₀ and the transformer 23, which require direct current supply generally referred to as B supply.

The point 2 between the inductance 32 and the balancing resistance R₂ is connected with the first or accelerator grid 50 of the tube.

The filament 5 which also forms the cathode of the tube is connected with its two ends to the two ends of a resistance 22, the center tap 22′ of which is connected at 3 to the negative terminal 31. The filament 5 is connected with one side to a charge grid 19.

The supply of heating current for the filament is omitted for sake of simplicity.

The signal input from the receiver is supplied from the terminals 33 and 34, the terminal 33 being connected to a control grid 20 and the terminal 34 being connected through 3 to the negative terminal 31. The control grid is connected with the negative side of a bias battery 10, the positive side of which is connected through 3 to the negative terminal 31.

A blocking condenser 25 is connected across the load 24. Again a condenser 18 is provided across the source E.

Similarly to the previous cases, the ripples in the rectified current flowing through the balancing resistance $R_2$ cause an alternating voltage to be impressed on grid 50, thereby generating in the tube alternating currents which are of the same phases, frequencies and amplitudes as the ripples whereby the potential at the points 1 and 3 as far as the ripple voltages are concerned will be the same.

The conditions for balance are now $$R_2 = \frac{R_3}{M'}$$

where $R_3$ is the plate resistance of the tube and $M'$ is the amplification factor of the tube as measured from grid 50.

The points 1 and 3 being at the same potential as far as the ripples are concerned, no ripples will flow either through the primary winding 23' of the output transformer 23 or the load 24.

Suppression of the ripples has no effect on the alternating signal voltages passing through the tube. The signal currents flow from plate 6 through the primary coil of transformer 23, condenser 25, point 26 to point 3, center tap 22' to the cathode 5 of the tube. The signal current flowing through the primary winding of the output transformer is setting up a current in the secondary coil of the transformer 23 which flows through the reproducing of indicating device S. The choke 32 is provided to prevent the signal from flowing back into the rectifier.

It should be mentioned that while both the choke 32 and the capacities 25 and 18 cause some filtering, the values of the inductance 32 and of the capacities 25 and 18 are only selected for the purposes above specified and the incidental filtering so obtained is much too small for satisfactory operation.

It should be noted that the resistance $R_2$ is directly coupled to the grid 50 without the use of an intermediate condenser 8. This is because of the fact that the accelerator grid 50 must be maintained at a direct current potential somewhere near that of the plate of the tube.

It should be well understood that in the circuit arrangement just described instead of using a pentode, any other tube having more than one grid can be used; also instead of the accelerator grid, any other grid of such tubes may be used for the generation of the ripple components.

Fig. 6 illustrates the use of a three-electrode tube in the dual role of amplifier and filter. The rectified current is again applied to the positive terminal 30 and negative terminal 31, and flows from the terminal 30 through an impedance 32 and point 1 to the plate 6.

From 1 the circuit branches in two—one branch leading through the tube T via its plate 6 and cathode 5 through a resistor 22 and center tap 22', point 3 to the primary coil 35 of a current transformer 37, back to the negative terminal 31.

The other branch goes from 1 through the primary coil 23' of the output transformer 23, point 24', a condenser 25 to 3, from where the circuit is completed as previously described.

The B supply for the remainder of the receiver represented by the load 24 is obtained from the terminals 24' and 3. The input signal from the receiver (not shown) is applied to the terminals 33 and 34, the terminal 33 being connected to the grid 7 and the terminal 34 being connected through the secondary coil 36 of transformer 37 to point 3. The grid bias is again secured from a battery 10 the negative side of which is connected to the grid 7 through a resistance 9, the positive side of the battery being connected at 29 to the negative side of the rectified current supply. The balancing resistance $R_2$ is connected across the points 3 and the terminal 39 of the winding 36 of the current transformer 37.

The heating current for the filament is omitted, for simplicity. Again a condenser 18 is provided across 30 and 31.

The elimination of the ripples is now obtained as follows:

The ripples flow through the primary coil 35 of the current transformer 37 and induce a voltage into secondary coil 36 which is returned to the balancing resistance $R_2$. The voltage drop across the resistance $R_2$ is impressed upon the grid 7 connected to the resistance $R_2$ through battery 10 and resistance 9.

The relation of the primary winding 35 and secondary winding 36 of the transformer 37 is such that the current passing through the secondary winding is shifted by 180° compared to the current in the primary.

If the ratio of the turns of the primary and secondary winding 35 and 36 and the value of the resistance $R_2$ are properly chosen, a balanced condition will again be obtained whereby no current due to the ripples will flow between points 1 and 3. The ripples will be eliminated from the current flowing through the primary winding of the output transformer 23 and also from the B-supply for the remainder of the receiver.

The path of flow of the signal current will be similar to that described in connection with Fig. 5; however, if the impedance of the primary winding 35 is sufficiently large compared to the impedance of the output transformer 23 the inductance 32 may be dispensed with.

In Fig. 7 I have shown another circuit arrangement in which an output tube T of the three-electrode type is used as a filter tube. The arrangement is essentially the same as that shown in Fig. 6 except that the phase shift of 180°, which has been obtained in the former example by means of the current transformer 37 is now obtained by the tube $T_1$ of the stage preceding the output stage. This is based on the fact that the grid voltage of a tube is 180° out of phase with the plate current of the tube.

The rectified current is applied to the terminals 30 and 31 across which is provided a blocking condenser 18, the current flowing from terminal 30 through inductance 32—for which the field coil of the loud speaker may be used—to the point 1, from which the current branches in two.

One branch goes to plate 6 through cathode 5, resistance 22 and its center tap 22' through 3, and balancing resistance $R_2$ the end 38 of which is connected to the negative terminal 31.

The other branch goes from 1 to the primary winding 23' of the transformer 23, the condenser 25 to 3, from which the circuit is again completed as previously indicated.

The B supply for the remainder of the receiver, represented by the impedance 24, is again supplied from the terminals 24' and 3.

The reproducing or indicating device S is connected to the secondary of the transformer 23.

The input signal from the detector or a preceding amplification stage is obtained at terminals 50 and 51, the terminal 51 being directly connected to the point 3 while the terminal 50 is connected through a condenser 41 to the grid 7' of the tube T. The grid 7' is also connected through a resistance 40 to the terminal 38 of the balancing resistance $R_2$.

The output signal of tube T is impressed upon grid 7 of tube $T_1$ and the plate 6' of tube T is connected to the grid 7 of the tube $T_1$ by means of a coupling condenser 43. The B-supply for the plate of tube T is obtained from the point 24' connected to the plate 6' through an intermediate resistance 44.

As will appear in this arrangement the resistance $R_2$ impresses on grid 7' voltages corresponding to the alternating ripples to be eliminated. This in its turns generates in the plate circuit of tube T corresponding ripples which are impressed on the grid 7 of tube $T_1$. The ripples generated in the tube $T_1$ are of proper amplitude to prevent alternating currents due to ripples to flow between points 1 and 3.

In Fig. 8 I have illustrated my invention as applied to an output stage in which two tubes are used in push-pull arrangement.

The rectified current is again supplied from terminals 30 and 31, the terminal 31 being connected through 3 to the center tap 22' of the resistance 22 to which the ends of the filaments 5—5 of both tubes are connected.

The positive terminal 30 is connected through the balancing resistance $R_2$ and a balancing impedance $L_2$—the latter can be omitted in most cases as will be explained hereafter—through a point 1' to the center tap 55 of the primary winding 54 of an output transformer 56 and the plate 6—6 of the two tubes are connected to the two ends of said winding 54.

The load 24 corresponding to the B-supply required for the remainder of the receiver is connected to the points 1' and 3.

The signal voltage is applied at 60 and 61 to the primary winding of an input transformer 57, each end of the secondary winding 58 of which is connected with one grid 7 of the tubes respectively.

The resistance $R_2$ is connected at 38 by means of a coupling condenser 52 to the center tap 60 of the secondary winding 58 of an input transformer 57. The point 60 is also connected to the grid resistance 9 and the grid bias battery 10, the positive side of which is connected to the negative terminal 3.

The output which represents the combined output of the two tubes is supplied from the secondary winding 53 of the output transformer 56 to the reproducing or indicating device S.

Again the alternating current ripples prevailing in the rectified current, cause a voltage drop in the resistance $R_2$ and impedance $L_2$, and the voltages impressed on the grids 7—7 cause the tubes to generate alternating currents to suppress the ripples, whereby at points 1 and 3 again the same potential exists as far as the ripples are concerned.

It should be noted that the phases and amplitudes of the voltages impressed on the grids 7—7 due to the ripple components are the same insofar as they traverse each half of the primary winding 54 of the output transformer 56 in opposite directions. Voltages due to the ripples are set up in S which are equal and opposite, thereby nullifying one another. In the case of the signal, however, the voltages on the grids 7—7 are equal in amplitude but opposite in phase; therefore as they traverse each half of the primary winding 54 of the output transformer 56 in the same direction the voltages set up in the secondary winding 53 are additive. It should be noted that while in this case the provision is made to filter out the rectified current required on the load 24, additional filtering is required for the remainder of the receiver. This may be obtained by making the condenser 18 have a very large value of 12 to 20 mfd. which can be obtained by the use of electrolytic condensers.

It should be noted that in case the coefficient of coupling between the two halves of the primary winding 54 of the output transformer 56 is unity or substantially unity, the inductance $L_2$ may be dispensed with.

In case indirectly heated cathode tubes are used instead of the illustrated tubes using the filament as cathode, the circuits are accordingly modified. The changes so effected are obvious for those skilled in the art and therefore their illustration has not been deemed necessary.

While I have described my invention in connection with radio receiving devices and more particularly with the output stage of such devices, it should be well understood that my invention is not limited to such applications but has a wide field of application where it is required to eliminate the ripples of a rectified current.

In the same way it should be understood that various modifications of the circuit arrangements illustrated can be obtained without deviating from the spirit of my invention nor do I wish to be limited to the use of vacuum tubes or discharge tubes of thermionic type as my invention can be applied to other types of discharge tubes.

I wish therefore my claims to be construed as broad as permissible in view of the prior art.

What I claim to be new and desire to secure by Letters Patent is:

1. In an electric circuit arrangement, a source of rectified current comprising alternating current ripples, a load and means to eliminate in the load the influence of the ripples, said means comprising a discharge tube having a plate, a cathode and a grid and a balancing impedance in series with the source of supply, said impedance being connected with one end between the plate and the load, and with the other end being connected through a branch circuit to the grid, said branch circuit including a condenser, said impedance having a value substantially equal to the tube impedance divided by the amplification factor of the tube.

2. In an electric circuit arrangement, a source of rectified current comprising alternating current ripples, a load and means to eliminate in the load the influence of the ripples, said means comprising a discharge tube having a cathode and an anode connected to the two ends of the load, said tube having a negatively biased grid, and a balancing resistance connected to the positive side of the source and in series with the load, said resistance having a value substantially equal to the plate resistance of the tube divided by the amplification factor of the tube, said grid being connected through a branch circuit to that end of the resistance which is connected to the source, said branch circuit including a condenser.

3. In an electric circuit arrangement, a source of rectified current comprising alternating current ripples, a load and means to eliminate in the load the influence of the ripples, said means comprising a discharge tube having an anode, a cathode and a grid, said anode and cathode being connected across the load, an impedance through which said rectified current flows, said impedance being inserted between the source and the load on the anode side of the tube, and said grid being excited by the voltage drop caused in the impedance by said ripples.

4. In an electric circuit arrangement, a source of rectified current comprising alternating current ripples, a load and means to eliminate in the load the influence of the ripples, said means comprising an impedance through which said rectified current flows, said impedance being connected between the positive side of the source and the load, and a discharge tube having an anode and a cathode connected to the two sides of the load and a grid, said grid being excited from the voltage drop in said impedance, said impedance having a value substantially equal to the tube impedance divided by the amplification factor of the tube, and excitation of the grid by said voltage drop causing the tube to generate alternating currents of phases and frequencies equal to that of the ripples and of such amplitudes that no ripples will be supplied to the load irrespective of the value and character of the load.

5. In an electric circuit arrangement, a supply of rectified current comprising a direct current component and alternating current components, a load and means to suppress the effect of the alternating current components on said load, said means comprising an impedance and a discharge tube having an anode, a cathode and a grid, said impedance being connected with one of its ends to the load and to the anode, and with its other end to the positive side of the source of supply and to the grid, the load being connected with its other end to the cathode, said impedance having a value substantially equal to the tube impedance divided by the amplification factor of the tube, and the alternating voltage drop in the impedance providing an excitation for the grid of such character that the tube generates currents which prevent the alternating current components from flowing through the load irrespective of variations in the load.

6. In an electric circuit arrangement, a load, a supply of rectified current and means to suppress the alternating current components in said rectified current comprising a discharge tube having an anode, a cathode and a grid, an impedance in series with the supply and the load, said impedance being connected with one of its ends to the anode and connected with its other end to the grid, means to negatively bias said grid, the value of said impedance being so selected that the cathode and the connecting point between the impedance and the anode are of the same potential as far as the alternating current components are concerned.

7. In an electric circuit arrangement a source of rectified current comprising a direct current component and alternating current ripples, a load supplied from said source and means to suppress the ripples at the load irrespective of the value and nature of the load, said means comprising a balancing impedance through which passes the rectified current, and a discharge tube having a cathode and an anode which are connected across said load, said impedance having a value substantially equal to the tube impedance divided by the amplification factor of the tube, said discharge tube having a grid connected with said impedance and excited from the alternating voltage drop in said impedance, said grid so excited causing the tube to generate currents of amplitudes, frequencies and phases adapted to counteract the influence of the ripples on the load.

8. In an electric circuit arrangement comprising a discharge tube, provided with a plate and a plurality of grids, a signal input circuit for one grid of the tube and a signal output circuit for the plate of said tube, and a source of rectified current comprising alternating current ripples, a load to be supplied with said rectified current and means to suppress the effect of the ripples on the load, said means comprising a resistance connected to the positive side of the source of rectified current and in series with the load, the voltage drop in said resistance being applied to a second grid of said tube to generate in the tube alternating currents which counteract the effect of the ripples on the load, said balancing resistance having a value substantially equal to the plate resistance of the tube divided by the amplification factor of the tube as measured from the second grid.

WILLIAM LE ROY DUNN.